US010552794B2

(12) United States Patent
Jia

(10) Patent No.: US 10,552,794 B2
(45) Date of Patent: Feb. 4, 2020

(54) SYSTEM FOR MONITORING STATUS OF GOODS IN LOGISTICS PROCESS AND USING METHOD THEREOF

(71) Applicant: Ruoran Jia, Shenzhen (CN)

(72) Inventor: Ruoran Jia, Shenzhen (CN)

( * ) Notice: Subject to any disclaimer, the term of this patent is extended or adjusted under 35 U.S.C. 154(b) by 0 days.

(21) Appl. No.: 16/059,063

(22) Filed: Aug. 9, 2018

(65) Prior Publication Data

US 2019/0392376 A1 Dec. 26, 2019

(30) Foreign Application Priority Data

Jun. 21, 2018 (CN) .......................... 2018 1 0644184

(51) Int. Cl.
*G06Q 10/08* (2012.01)
*H04W 4/80* (2018.01)
*H04L 29/08* (2006.01)

(52) U.S. Cl.
CPC ....... *G06Q 10/087* (2013.01); *G06Q 10/0833* (2013.01); *H04W 4/80* (2018.02); *H04L 67/125* (2013.01)

(58) Field of Classification Search
CPC ... G06Q 10/087; G06Q 10/0833; H04W 4/80; H04L 67/125
See application file for complete search history.

(56) References Cited

U.S. PATENT DOCUMENTS

| | | | |
|---|---|---|---|
| 7,866,555 B2 * | 1/2011 | Schmid ................. | G06K 17/00 235/385 |
| 8,047,432 B2 * | 11/2011 | Breed .................... | G01F 23/20 235/384 |
| 2008/0174485 A1 * | 7/2008 | Carani ................... | G06Q 10/08 342/357.46 |

* cited by examiner

*Primary Examiner* — Seung H Lee
(74) *Attorney, Agent, or Firm* — Gokalp Bayramoglu

(57) ABSTRACT

The present invention provides a system for monitoring status of goods in logistics process, including a power module, a main control module, a communication module, a status sensor, a terminal electronic device and a data center. The power module supplies power to the main control module, the communication module, and the status sensor, respectively. The status sensor detects the goods status information and transmits the goods status information to the main control module, the main control module then transmits the goods status information to the data center directly or indirectly via the communication module, and then the monitoring information is transmitted from the data center to the terminal electronic device. Finally, the monitoring information is displayed by the terminal electronic device, and the monitoring information is analyzed and processed by the data center. The status monitoring device can be repeatedly used.

7 Claims, 3 Drawing Sheets

SYSTEM FOR MONITORING STATUS OF GOODS IN LOGISTICS PROCESS AND USING METHOD THEREOF

CROSS REFERENCE TO RELATED APPLICATIONS

This application is based upon and claims priority to Chinese Patent Application No. 2018106441843, filed on Jun. 21, 2018, the entire content of which is incorporated herein by reference.

TECHNICAL FIELD

The present invention relates to the technical field of logistics monitoring devices, and particularly to a micro device for monitoring the status of goods in a logistics process and a monitoring system thereof.

BACKGROUND

With the rapid development of the internet economy, express logistics is closely related to people's work and life. The status of the goods in the logistics process, such as vibration, tilt, temperature, humidity, etc., will have an impact on the quality and service life of the goods. In recent years, due to the increasing number of disputes over goods damage caused by logistics, the state of goods in the logistics process has not only become the concern of buyers, but also become the crucial for distributors and manufacturers; it is also the key point for logistics enterprises to improve service quality.

In traditional logistics process, status monitoring is realized by using mechanical vibration monitoring labels and tilt monitoring labels. The principle is that after the problem exceeding the setting threshold appears, the label starts to irreversibly record (such as discoloration, etc.). The mechanical monitoring label with such principle could be used only once (i.e. cannot be recycled and reused), which leads to an increase in logistics costs and only high-value goods can afford it. In addition, the main drawbacks are: the critical information of logistics status like when did something go wrong, what went wrong, how serious the problem was, and how many times the problem occurred etc. is not available. Moreover, the verification of such mechanical monitoring labels can only be carried out manually, and the automatic collection of large-scale status data cannot be performed.

With the rapid development of electronic information technology, the accuracy, power consumption and price of the status (such as vibration, tilt, temperature, humidity, etc.) monitoring sensors have fully met the requirement of status monitoring in the logistics process, therefore, the electronic status monitoring device can be used to achieve monitoring of logistics status. Due to the popularity of terminal electronic devices (especially smartphones) and the increasing maturity of narrow band communication technology; the logistics status data monitored by the electronic status monitoring devices can not only be very conveniently displayed on the terminal electronic devices (such as smartphones), allowing users to fully understand the real logistics status; but also can be quickly and efficiently gathered in the data center for logistics companies and distributors to resolve disputes or improve management standards. At the same time, such an electronic status monitoring device can be reused without burdening the logistics enterprises.

Therefore, there is an urgent need for a recyclable intelligent monitoring system for monitoring the status of goods in the logistics process, thereby realizing automatic data collection and transmission, facilitating dispute resolution and improving management level.

SUMMARY

The present invention provides a system for monitoring the status of goods in logistics process, including a power module, a main control module, a communication module, a status sensor, a terminal electronic device and a data center. The power module supplies power to the main control module, the communication module, and the status sensor, respectively. The status sensor detects the goods status information and transmits the information to the main control module, the main control module then transmits the information to the data center directly or indirectly via the communication module, and then the information is transmitted from the data center to the terminal electronic device, and finally the monitoring information is displayed by the terminal electronic device. The monitoring system provided by the present invention performs calculation and analysis application on the monitoring data through the data center.

Further, the terminal electronic device is a mobile terminal or a fixed terminal. The mobile terminal is a mobile smart device with communication functions, such as a smartphone, an express scanning mobile terminal, a tablet computer or a laptop. The fixed terminal is a computer, a workstation or an express cabinet display equipment, and other fixed electronic devices that can be used to display and analyze data. The mobile terminal can display the goods status information remotely, so that the user can remotely access the status of the goods.

Because the abnormal status data recorded in the data center can be accessed by the user's mobile terminal (such as a smart phone) for display, it can help the recipient to check the goods. Recipient can make a decision on whether to sign for the goods by checking the status monitoring data of the goods in the logistics process on the smartphone. In addition, the smartphone acquires the monitored abnormal status data from the logistics status monitoring device through a near field communication technology (such as Bluetooth), or downloads the monitored abnormal status data through the Internet connecting to the data center. The mobile terminal is suitable for the use by logistics couriers, senders and recipients. The fixed terminal is suitable for the use by logistics companies, distributors or manufacturers to resolve disputes or improve management levels; and the fixed terminal can perform the big data analysis with the strong computing capability.

In addition, the terminal electronic device has a function of screen display, which can display the monitoring information on site to facilitate the recipients to check the goods on site.

Further, the transmission mode of communication module includes direct transmission and indirect transmission. The direct transmission refers to directly transmitting the collected goods status information to the data center through a narrow band communication technology (such as NB-IoT or LoRa, etc.), and the indirect transmission refers to transmitting the collected goods status information to the data center through forwarding method of the terminal electronic device. Moreover, the indirect transmission reduces the configuration requirements of the communication module and the main control module, further realizing the miniaturization of the logistics monitoring device. In addition, abnormal data can be used by logistics companies, distributors or manufacturers to resolve disputes or improve standards of management.

Further, the power module is an on-board power module, a solar module or a battery module. The battery module is a portable battery, preferably a button cell battery. The button cell battery realizes the miniaturization of the logistics monitoring device, and is durable and replaceable.

Further, the data center is a cloud server. Compared with the data storage device using physical server, the cloud server is more powerful in computing or storage, and has the characteristics of simple and efficient, safe and reliable, and flexible in processing capability, etc. Also, the management mode of the cloud server is easier and more efficient than that of the physical server, users can quickly create or release any number of cloud servers without having to purchase hardware in advance. Cloud servers can quickly build more stable and secure applications, reducing the difficulty of development and operation and the overall IT costs.

Further, the main control module also includes a warning feedback module for issuing a warning signal to the abnormal data detected by the status sensor.

Preferably, the warning feedback module is electrically connected to the power module and the communication module through a switch. Whether to enable the warning feedback module depends on the sensitivity of the transported goods to the status (such as vibration, tilt, temperature, humidity, etc.); if the transported goods are very sensitive and strict to the status, that is, the abnormality of the status may result in the invalid of the function of the transported goods. The warning feedback module needs to be enabled to facilitate the transportation personnel to obtain the abnormal data information in time, and to make timely remedial measures to prevent the loss from expanding. If the transport goods are not sensitive to the status, the warning feedback module can be chosen to be enabled or not.

Preferably, the warning feedback module can directly or indirectly issue a warning signal.

The warning signal issued directly includes an alarm light, an alarm horn or an audible visual alarm set at a position that can attract the attention of the transportation personnel, which is connected with the warning feedback module.

The warning signal issued indirectly includes the detected abnormal data transmitted by the warning feedback module to the data center through the communication module, hint information pushed to the related application (APP) software or the logistics transport personnel through the data center, or warning call to the logistics transport personnel from the data center.

Further, the main control module includes a real-time clock module and a data storage module. The data storage module is used to acquire and store the monitoring data sent by the status sensor, and the data storage module may temporarily store the monitoring data, especially when the monitoring data is indirectly transmitted through the terminal electronic device. Further, the main control module also includes a power management module, a sleep wake-up module and a positioning module.

The real-time clock module is used to acquire a real-time time signal and transmit it to the main control module. In addition, the geographical location information of the vehicle is obtained by the positioning module, and the goods information and the geographical location information of the delivery vehicle are transmitted to the cloud data processing center in real time through wireless communication.

The data storage module is used to acquire and store the monitoring data sent by the main control module.

Further, the sleep wake-up module is used to detect the use status of the terminal and issue a sleep signal or a wake-up signal to the main control module, and then the main control module sends a power control signal to the power-saving management module according to the sleep signal or the wake-up signal.

Further, the status sensor includes a temperature and humidity measurement module and an impact inclination measurement module. For example, collecting vehicle speed, acceleration, angular velocity formation, etc. in real-time through a gyroscope and an accelerometer.

Further, the impact inclination measurement module includes an impact force measurement module and an inclination measurement module. The impact force measurement module is used to collect an external impact force signal and transmit it to the main control module; the inclination measurement module is used to be installed on the monitored object and monitor the incline angle signal of the monitored object in real time, and then transmit the incline angle signal, to the main control module; the impact inclination measurement module uses the ADXL375 wide range sensor.

Further, the temperature and humidity measurement module is used to collect the temperature and humidity signals in the environment in real time and transmit them to the main control module. The temperature and humidity measurement module is a DHT11 digital temperature and humidity sensor.

Further, the data center is used to analyze and process the received temperature and humidity signals, real-time time signals, geographic coordinate signals, impact force signals, and incline angle signals, separately, and then forming monitoring data. The monitoring data includes temperature values and humidity values, real-time time, geographic coordinates, impact force, and incline angle values. Finally, the monitoring data by the data center was sent to the terminal electronic device, such as the mobile terminal for display. The present invention performs signal storage and analysis processing through the data center, on one hand, reducing the extra burden of the underlying hardware such as the main control module, realizing miniaturization, and on the other hand, correspondingly improving the signal transmission and processing capability for accessing to the data center. In addition, the data center can perform the subsequent application such as statistical analysis and classification on large-scale monitoring information, monitoring and managing the whole logistics process, so as to facilitate dispute resolution and improve management level.

In addition, a monitoring device for the system for monitoring status of goods in the logistics process includes a power module, a main control module, a communication module and a status sensor. The power module supplies power to the main control module, the communication module, and the status sensor, respectively. The status sensor detects the status signals and transmits the signals to the main control module, and then the main control module transmits the signals to the data center through the communication module. The monitoring device can be recycled and reused, after the logistics distribution is completed.

The present invention provides a method for using the goods status monitoring system in the logistics process:

the first step: installing the logistics monitoring device on the outside of goods or their packaging;

the second step: scanning the two-dimensional code on the logistics monitoring device through the "scan QR-code" function of the special software such as WeChat or Alipay software installed in the terminal electronic device to complete the binding of the logistics monitoring device and the goods, meanwhile activating the logistics monitoring device to enter the status monitoring mode, and reporting the binding and activation information to the data center;

the third step: during the transportation of goods, automatically recording the data of abnormal status, such as manner, intensity and time of the abnormality by the logistics monitoring device;

the fourth step: scanning the two-dimensional code on the logistics monitoring device through the "scan QR-code" function of the special software such as WeChat or Alipay software installed in the terminal electronic device to obtain the abnormal status data in the logistics process, and checking it on special software or WeChat;

the fifth step: removing the logistics monitoring device from the outside of goods or their packaging, and recycling for reuse.

The present invention has the following beneficial effects:

The present invention perform a moular design on the collection terminal, the functions of each module are relatively independent of each other, and overall controlled by the main control module, which is beneficial for improving the working efficiency and reliability of the collection terminal, and is convenient for debugging and maintenance; using a cell button battery as a power module, and setting the power management module, then program controlling the output of the power module through the main control module, are beneficial to improve the utilization of the power supply and reduce the system power consumption, thereby saving costs.

Finally, the present invention performs signal storage and analysis processing through the data center, on one hand, reducing the extra burden of the underlying hardware such as the main control module, realizing the miniaturization of the monitoring device, and on the other hand, correspondingly improving the signal transmission and processing capability for accessing to the data center.

DETAILED DESCRIPTION OF THE EMBODIMENTS

The present invention will be further described below with reference to the accompanying drawings and embodiments.

Embodiment 1

The technical schemes in the embodiments of the present invention will be clearly and completely described below with reference to the accompanying drawings in the embodiments of the present invention. It is obvious that the described embodiments are merely a part of the embodiments of the present invention, rather than all embodiments. Based on the embodiments of the present invention, all other embodiments obtained by one of ordinary skill in the art without creative work should fall within the protection scope of the present invention.

Figure 1:
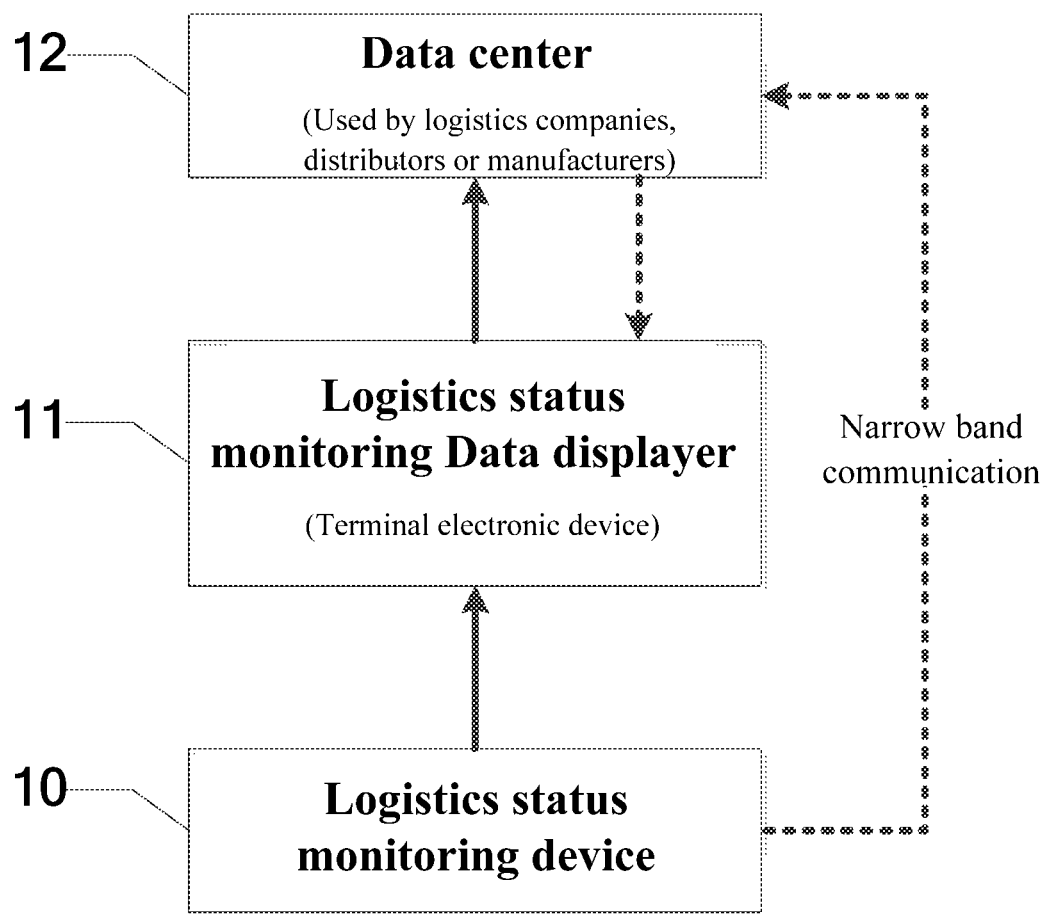
FIG. 1 is a schematic diagram of direct transmission of data of a goods status monitoring system in a logistics process of the present invention.
Figure 2:
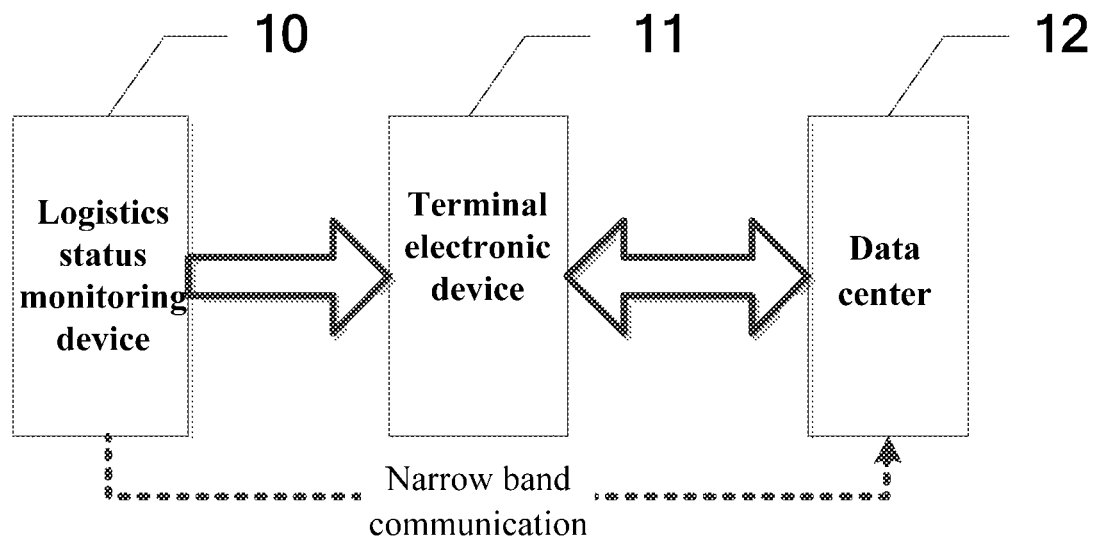
FIG. 2 is a schematic diagram of direct exchange of data of a goods status monitoring system in a logistics process of the present invention.
Figure 5:
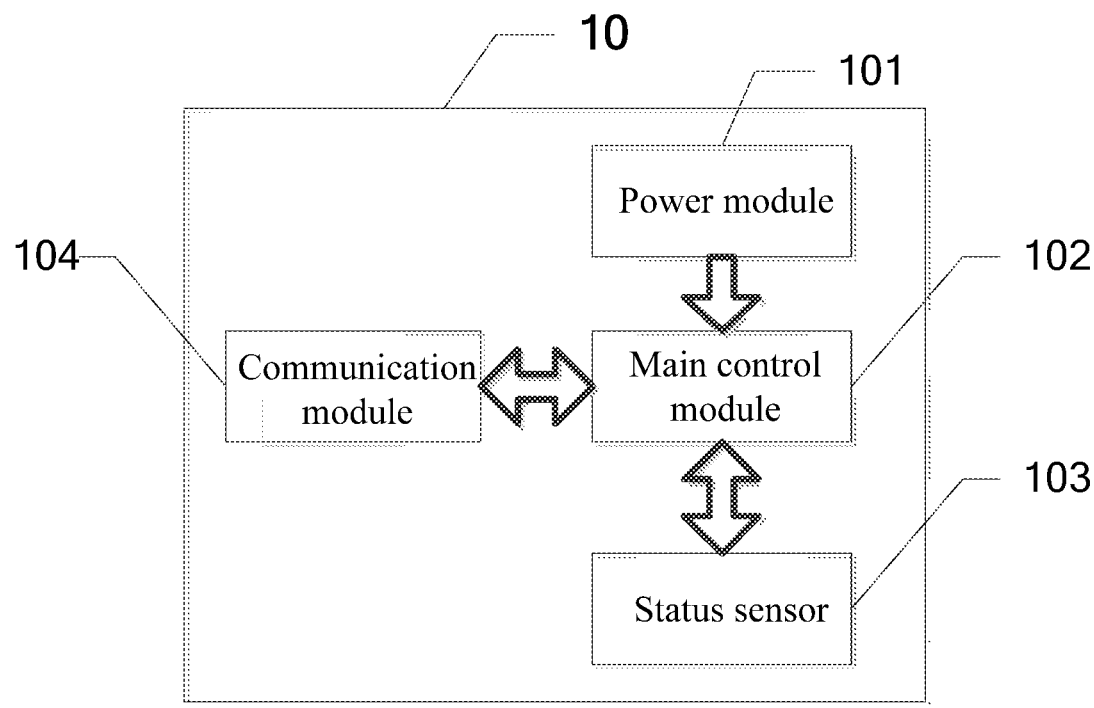
FIG. 5 is a structural diagram of a goods status monitoring system in a logistics process of the present invention.
Figure 6:
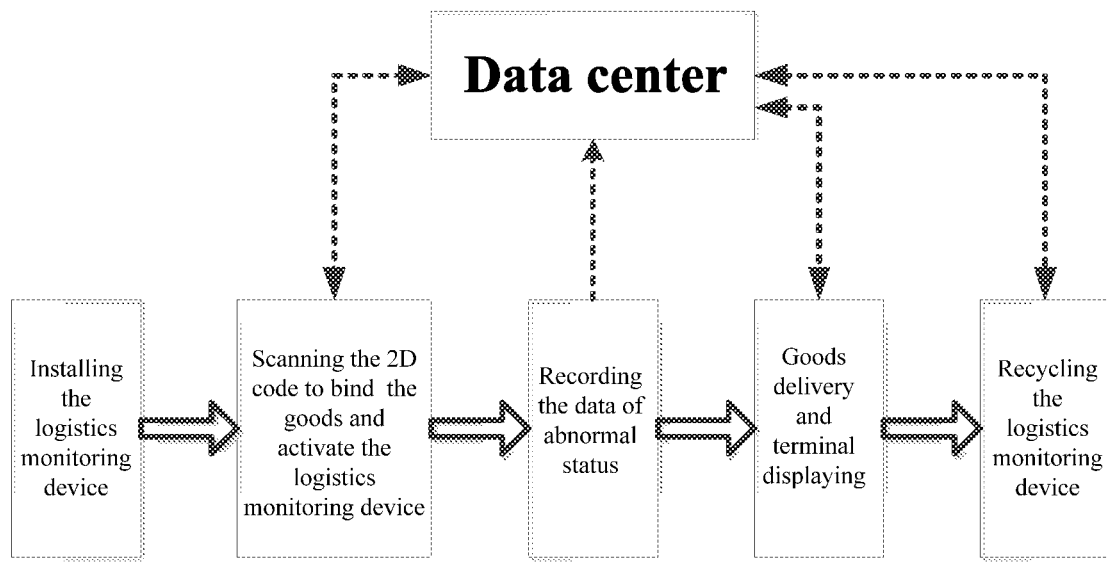
FIG. 6 is a flow chart of a method for using a goods status monitoring system in a logistics process of the present invention.

As shown in FIGS. 1-2 and 5, the present invention provides a system for monitoring the status of goods in a logistics process, including a power module 101, a main control module 102, a communication module 104, a status sensor 103, a data center 12 and a terminal electronic device 11. The power module 101 supplies power to the main control module 102, the communication module 104, and the status sensor 103, respectively. The status sensor 103 detects the goods status information and transmits the information to the main control module 102, the main control module 102 then transmits the information to the data center 12 directly via the communication module 104, and finally the information is distributed by the data center 12 to the terminal electronic device 11, such as a fixed terminal or a mobile terminal to display the monitoring information.

Further, the main control module also includes a power management module, a real-time clock module, a data storage module, a sleep wake-up module and a positioning module. The main control module selects the nRF52810QCAA Bluetooth chip, which is integrated with the ARM® Cortex-M4 kernel internally, and has rich FLASH and RAM space.

The power management module is used for power saving management of the main control module, the real-time clock module, the data storage module, the sleep wake-up module and the positioning module, the temperature and humidity measurement module, and the impact inclination measurement module; the power management module receives the power control signal sent by the main control module and performs power saving management on the output of the power module according to the power control signal; the power module uses a rechargeable lithium-ion button battery.

The real-time clock module is used to acquire an accurate real-time time signal and transmit it to the main control module to ensure the real-time and accuracy of the monitoring data; the real-time clock module selects a 32K768 clock chip.

The data storage module is used to acquire and store the monitoring data sent by the status sensor; the data storage module selects a FLASH memory chip of the model W25Q80.

The sleep wake-up module is used to detect the use status of the terminal and issue a sleep signal or a wake-up signal to the main control module, and then the main control module sends a power control signal to the power-saving management module according to the sleep signal or the wake-up signal, which is beneficial to ensure low power consumption.

Further, the status sensor includes a temperature and humidity measurement module or/and an impact inclination measurement module.

The temperature and humidity measurement module is used to collect the temperature and humidity signals in the environment in real time and transmit them to the main control module; the temperature and humidity measurement module is a DHT11 digital temperature and humidity sensor.

The impact inclination measurement module includes an impact force measurement module and an inclination measurement module, the impact force measurement module is used to collect an external impact force signal and transmit it to the main control module; the inclination measurement module is installed on the monitored object and monitor the incline angle signal of the monitored object in real time, and then transmit the incline angle signal to the main control module; the impact inclination measurement module selects the ADXL375 wide range sensor.

Further, the data center is used to analyze and process the received temperature and humidity signals, real-time time signals, geographic coordinate signals, impact force signals, and incline angle signals, separately, and then forming monitoring data. The monitoring data includes temperature values and humidity values, real-time time, geographic coordinates, impact force, and incline angle values. Finally, sending the monitoring data by the data center to the terminal electronic device for display. The present invention performs signal storage and analysis processing through the data center, on one hand, reducing the extra burden of the underlying hardware such as the main control module, realizing miniaturization of the device, and on the other hand, correspondingly improving the signal transmission and processing capability for accessing to the data center.

By adopting the selected nRF52810QCAA Bluetooth chip as the main control module, the cost is low, the operation rate is high, and the debugging is convenient; the 32K768 clock chip is used as the real-time clock module, which is beneficial to meet the requirements of low power consumption, low cost and small volume of the system; the impact inclination measuring module is arranged on the measured goods, which is beneficial to monitoring the angle of inclination and external impact force of the goods. The ADXL375 wide-range sensor is used as the impact inclination measuring module, which is advantageous for accurate measurement and reduction of power consumption.

Embodiment 2

Figure 3:
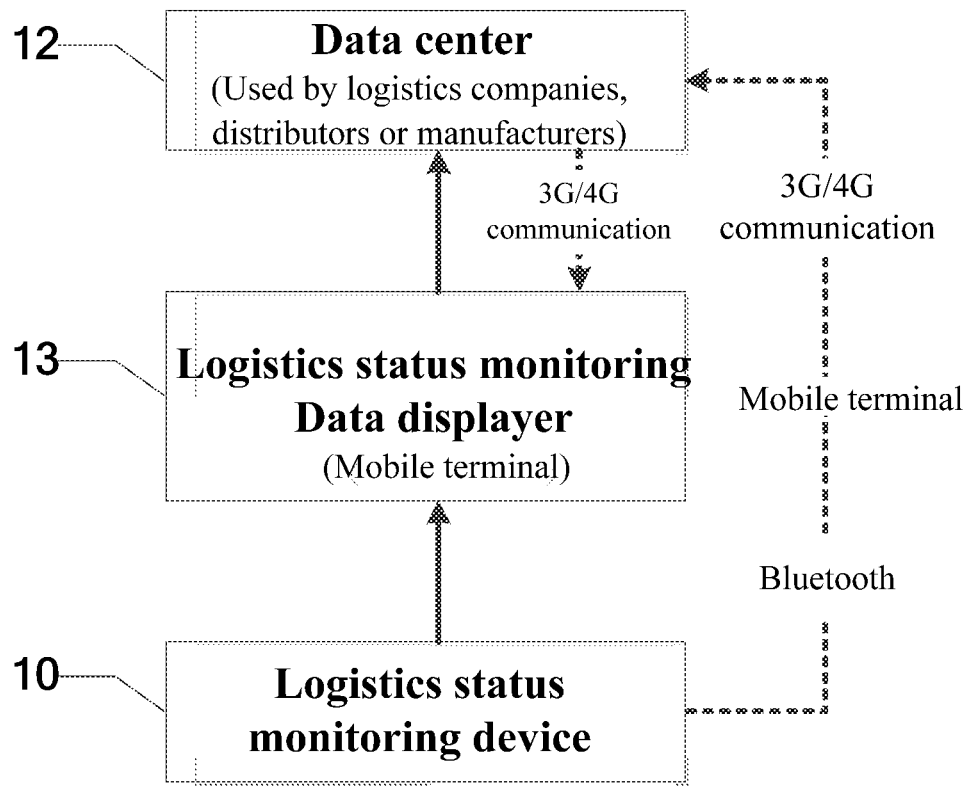
FIG. 3 is a schematic diagram of indirect transmission of data of a goods status monitoring system in a logistics process of the present invention.

As shown in FIGS. 3 and 5, the present invention provides a system for monitoring status of goods in a logistics process, including a power module 101, a main control module 102, a communication module 104, a status sensor 103, a data center 12 and a mobile terminal 13. The power module 101 supplies power to the main control module 102, the communication module 104, and the status sensor 103, respectively. The status sensor 103 detects the goods status information and transmits the information to the main control module 102, the main control module 102 then transmits the information to the data center 12 indirectly via the communication module 104, the indirect transmission means transmitting the monitored abnormal status data through the Bluetooth to the mobile terminal 13 and then forwarding the data to the data center through the mobile terminal 3G or 4G network, and finally the data center 12 distributes the data through the 3G or 4G network to the mobile terminal 13 to display the monitoring information.

Embodiment 3

Figure 4:
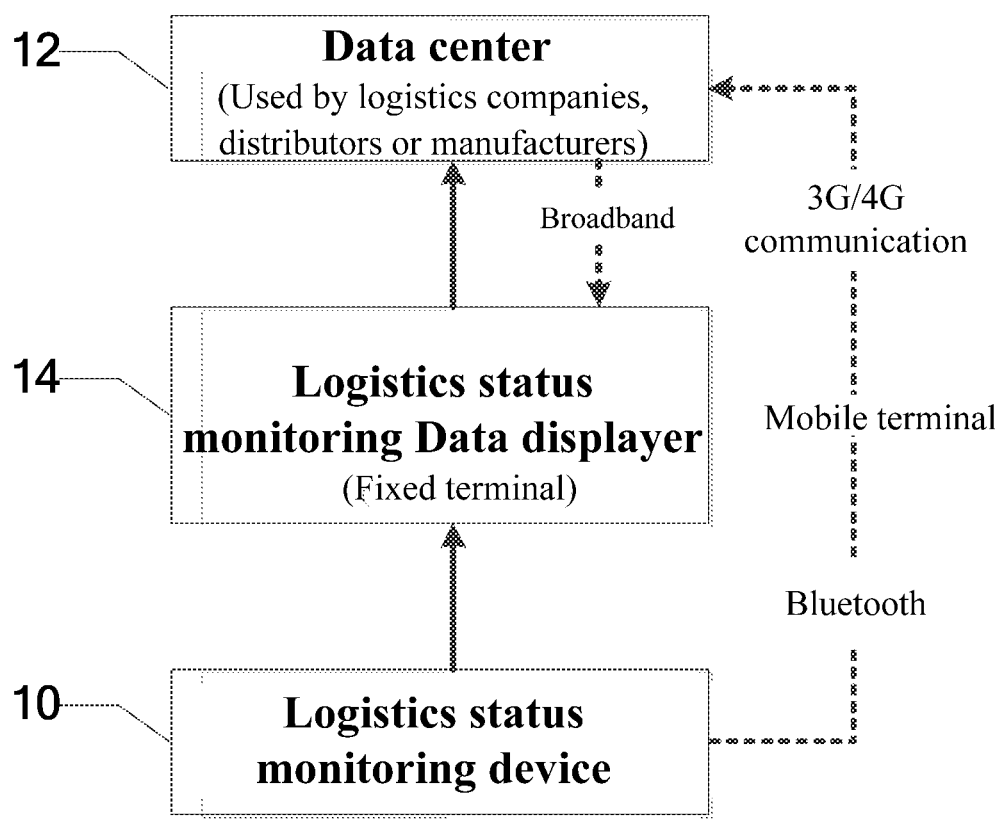
FIG. 4 is a schematic diagram of indirect exchange of data of a goods status monitoring system a logistics process of the present invention.

As shown in FIGS. 4 and 5, the present invention provides a system for monitoring the status of goods in a logistics process, including a power module 101, a main control module 102, a communication module 104, a status sensor 103, a data center 12 and a mobile terminal 13. The power module 101 supplies power to the main control module 102, the communication module 104, and the status sensor 103, respectively. The status sensor 103 detects the goods status information and transmits the information to the main control module 102, the main control module 102 then transmits the information to the data center 12 indirectly via the communication module 104, the indirect transmission means transmitting the monitored abnormal status data through the Bluetooth to the mobile terminal 13 and then forwarding the data to the data center through the mobile terminal 3G or 4G network, and finally the data center 12 transmits the data through broadband to the fixed terminal 14. The fixed terminals are used by logistics companies, distributors or manufacturers, such as computers or mainframe computers for big data analysis, to solve disputes or improve management level. Compared with mobile terminals, fixed terminals have characteristics of strong computing power and good analytical effect, etc.

Embodiment 4

As shown in FIGS. 1-6, the present invention provides a logistics status monitoring device 10, including a power module 101, a main control module 102, a communication module 104 and a status sensor 103. The power module 101 supplies power to the main control module 102, the communication module 104, and the status sensor 103, respectively.

In addition, the present invention provides a method for using the goods status monitoring system in the logistics process:

the first step: installing the logistics monitoring device on the outside of the goods or their packaging by logistics personnel;

the second step: scanning the two-dimensional code on the logistics monitoring device through the "scan QR-code" of WeChat or using the "two-dimensional code scanning function of APP software" of the logistics monitoring device to complete the binding of the logistics monitoring device and the goods, meanwhile activating the logistics monitoring device to enter the status monitoring mode by logistics personnel or consigner, and reporting the binding and activation information to the data center;

the third step: during the transportation of goods, automatically recording the data of abnormal status, such as manner, intensity and time of the abnormality by the logistics monitoring device; when an abnormal status is recorded, the device will emit a light prompt;

the fourth step: scanning the two-dimensional code on the logistics monitoring device through the "scan QR-code" of WeChat or using the "two-dimensional code scanning function of APP software" of the logistics monitoring device to obtain the abnormal status data in the logistics process, and deciding whether to sign the goods or not, after checking on the smartphone by recipients;

the fifth step: after the recipient confirmed to sign the goods, removing and recycling the logistics monitoring device from the packaging of goods by logistics personnel.

In the description of the present specification, the description of the reference terms "one embodiment", "example", "specific example", etc. means that the combination of the specific features, structures, materials or characteristics described in the embodiment or the example should be included in at least one embodiment or one example of the present invention. In the present specification, the exemplary expression of the above terms does not necessarily refer to the same embodiments or examples. Moreover, the specific features, structures, materials, or characteristics described may be combined in an appropriate manner in any one or more embodiments or examples.

The foregoing description is merely the preferred embodiments of the present invention, which is further detailed description of the present invention combining with the specific preferred implementation method, and cannot be considered as being limiting the invention. Any modifications, equivalent substitutions and improvements within the spirit and principle of the present invention should be included in the protection scope of the present invention.

The invention claimed is:

1. A system for monitoring status of goods in a logistics process, comprising a power module, a main control module, a communication module, a status sensor, a terminal electronic device and a data center;
   wherein the power module supplies power to the main control module, the communication module, and the status sensor, respectively;
   and the status sensor detects goods status information and transmits the goods status information to the main control module, the main control module then transmits the goods status information to the data center directly or indirectly via the communication module, and then the goods status information is transmitted from the data center to the terminal electronic device, finally the goods status information is displayed by the terminal electronic device;
   wherein the status sensor comprises a temperature and humidity measurement module and an impact inclination measurement module;
   wherein the impact inclination measurement module comprises an impact force measurement module and an inclination measurement module;
   wherein the impact force measurement module is used to collect an external impact force signal and transmit the external impact force signal to the main control module;
   and the inclination measurement module is installed on a monitored object and monitor an incline angle signal of the monitored object in real time, and then transmit the incline angle signal to the main control module.

2. The system according to claim 1, wherein the terminal electronic device is a mobile terminal or a fixed terminal.

3. The system according to claim 2, wherein an indirect transmission of the communication module refers to transmitting the goods status information to the data center through the terminal electronic device.

4. The system according to claim 1, wherein a direct transmission of the communication module refers to transmitting the goods status information to the data center through a narrow band communication technology.

5. The system according to claim 1, wherein the power module is an on-board power module, a solar module or a battery module.

6. The system according to claim 1, wherein the main control module further comprises a warning feedback module for issuing a warning signal to abnormal data detected by the status sensor.

7. The system according to claim 1, wherein the main control module further comprises a real-time clock module and a data storage module;
   and wherein the real-time clock module is used to acquire a real-time time signal and transmit the real-time time signal to the main control module.

* * * * *